United States Patent [19]

Schubeler et al.

[11] 4,064,395
[45] Dec. 20, 1977

[54] MACHINE CONTROL SYSTEM EMPLOYING A PROGRAMMABLE MACHINE FUNCTION CONTROLLER

[75] Inventors: Kenneth Erwin Schubeler, West Chester; Danny L. Carnahan, Lebanon; Dennis Grover O'Keefe, Cincinnati, all of Ohio

[73] Assignee: Cincinnati Milacron Inc., Cincinnati, Ohio

[21] Appl. No.: 715,146

[22] Filed: Aug. 17, 1976

[51] Int. Cl.$^2$ .................... G06F 15/46; G06F 15/16
[52] U.S. Cl. .................................... 364/107; 364/900
[58] Field of Search ...................... 235/151.11, 151.1; 340/172.5

[56] References Cited

U.S. PATENT DOCUMENTS

| 3,701,113 | 10/1972 | Chace et al. | 340/172.5 |
| 3,930,233 | 12/1975 | Morley et al. | 340/172.5 |
| 3,942,158 | 5/1974 | Dummermuth | 340/172.5 |

OTHER PUBLICATIONS

"Multiprocessor Concept Leads to PLC Hierarchies," *Control Engineering*, Jan. 1976, pp. 46 & 47.

Primary Examiner—Eugene G. Botz
Attorney, Agent, or Firm—C. Richard Eby

[57] ABSTRACT

A machine control system including a programmable machine function controller comprised of a logic processor and a data processor. The logic processor is responsive to first devices on a machine, e.g. limit switches and push buttons, for controlling second devices on the machine, e.g. motor starters and solenoids, in accordance with a program representing a desired machine operation. The data processor operates asynchronously with the logic processor but responds thereto for selecting programs of arithmetic instructions relating to the machine operation. The system includes a panel of push buttons, lights and read-outs located remotely from the controller. Signals are transmitted between the controller and the panel using asynchronously operating receiver/transmitters which multiplex and transfer the signals on a serial basis. The machine includes at least one movable member in mechanical communication with a driving mechanism. The controller employs circuits which are responsive to the data processor and logic processor for producing signals to the driving mechanism to control the motion of the movable element.

17 Claims, 5 Drawing Figures

MACHINE CONTROL SYSTEM EMPLOYING A PROGRAMMABLE MACHINE FUNCTION CONTROLLER

BACKGROUND OF THE INVENTION

The invention relates generally to the area of machine controls; and specifically, the invention provides a low cost machine control system designed around a programmable machine function controller.

Traditionally, machine function controllers have been used to control general machine operations, e.g. power and motor controls, spindles, start/stop, tool change functions, axis overtravels, etc. The apparatus disclosed herein provides the above; and in addition, circuits are provided which function in conjunction with the controller for producing signals to control the operation of a machine slide. In the preferred embodiment, elements are included for increasing and decreasing a programmed velocity which is then restored for use during a subsequent execution of the machine cycle.

In many situations, a panel of I/O devices, e.g., lights, push buttons, readouts, etc. may be mounted on a panel remote from the controller. This may be a main machine control station, a pendant mounted panel or an auxiliary control station. In prior art controls, these I/O devices are wired directly to the appropriate machine control circuits. This direct wiring represents a substantial cost in the machine construction.

The apparatus disclosed herein provides a serial data link for connecting remote machine control panels to the controller. Therefore, a pair of two conductor cables replaces the up to hundreds of wires otherwise needed. Further, in the preferred embodiment, the serial data link is used to continuously multiplex signals to the readouts thereby providing a real time display of information from the controller without the use of storage elements located with the readouts.

SUMMARY OF THE INVENTION

According to one embodiment of the invention, an apparatus is provided for controlling a machine having devices responsive to first output state signals for commanding the machine operations. The machine further includes second devices for producing input state signals in response to the machine operations. Further, the machine contains I/O devices remotely located from the apparatus for receiving output data signals and generating input data signals. Finally, the machine includes a movable element in mechanical communication with a driving mechanism. The apparatus comprises a controller means including a contact bus for transferring the input and output state signals and a data bus for transferring the input and output data signals. The controller means further includes a logic processor means responsive to the input state signals for executing stored sets of logic instructions to generate output state signals. Also within the controller is a data processor means connected between the contact bus and the data bus for generating the output data signals and a further input state signal by executing asynchronously with the logic processor means stored sets of arithmetic instructions in response to the input data signals and one of the output state signals. The apparatus further comprises an interface means connected between the contact bus and the first and second devices for controlling the transfer of the input and output state signals therebetween. The apparatus also includes means connected to the I/O devices for serially transferring input data signals and output data signals between the I/O devices and the controller means. Finally, the apparatus includes means responsive to the controller means and connected to the driving mechanism for controlling the operation of the driving mechanism in accordance with the logic and arithmetic instructions contained in said controller means.

BRIEF DESCRIPTION OF THE DRAWINGS

FIG. 4 is a detailed block diagram illustrating the apparatus necessary for controlling the displacement of the movable element.

DESCRIPTION OF THE PREFERRED EMBODIMENT

Figure 1:
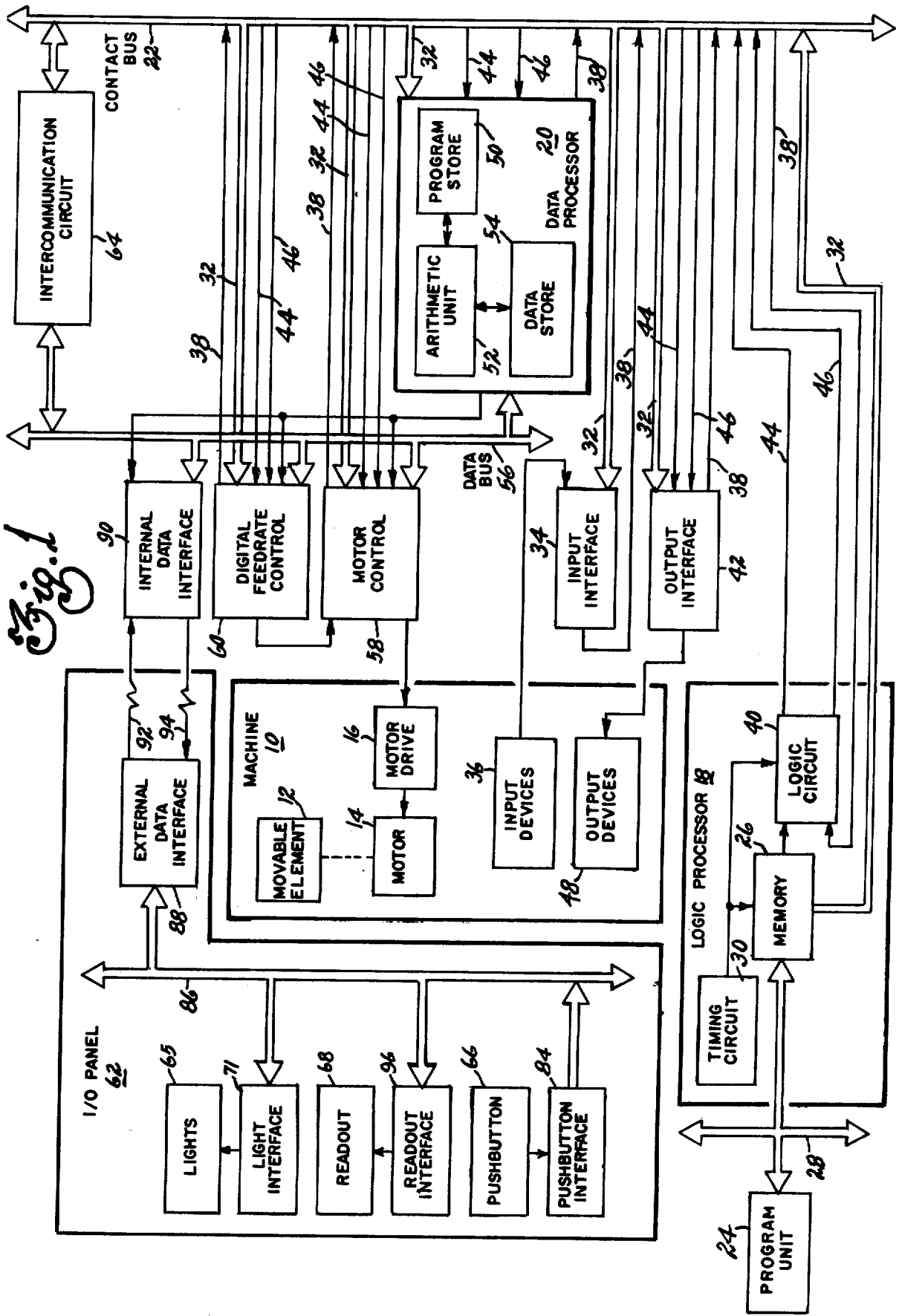
FIG. 1 is a general block diagram illustrating the machine control system.

FIG. 1 is a general block diagram illustrating the basic elements of the control system. A machine 10 contains at least one movable element 12. The element 12 is mechanically connected to a motor 14 which is responsive to a motor drive circuit 16. The functional operation of the machine 10 is controlled by a programmable machine function controller having as its principle elements a logic processor 18 and the data processor 20. These elements are interconnected by a contact bus 22. The contact bus 22 is comprised of an address bus 32, a single data bit line 46 defining the state of output signals, a single data bit line 38 defining the state of input signals and a timing control line 44.

The functional operation of the machine may be schematically represented by a ladder or relay diagram. Using this diagram in conjunction with a program unit 24, a logic program defining the machine operation may be created. Each step of the program will typically include a device address and the logic function associated therewith. The combination of these two pieces of information is defined as a memory word. In the preferred embodiment, blocks of device addresses are allocated and preassigned according to the devices present, e.g. external coils, external contact inputs, timers, data processor functions, functions associated with other control devices, etc. Therefore using the program unit 24, a programmer selects a starting memory location and works through the ladder diagram serially along each line. Each memory word will contain an element definition, e.g. no operation, output, input, a device address within a preassigned block associated with that element, if applicable; and other necessary function information relative to the condition of the addressed device, e.g. normally open, or normally closed contact state. After the program has been completed, the program unit 24 may be used to transfer the program to a memory 26 within the logic processor 18 via the program bus 28. A timing circuit 30 continuously scans the memory 26.

As each memory word is read, the device address is transmitted to the contact bus 22 via an address bus 32. If the device address represents an input element, an input interface 34 will respond to the device address on the address bus 32 to energize a circuit therein which is connected to receive the state of a corresponding input device 36 located on the machine. The state of the addressed input device is transmitted along a contact state line 38 via the contact bus 22 to a logic circuit 40 within the logic processor 18. Logic circuit 40 determines whether or not the actual contact state agrees with the programmed contact state. As long as there is agreement between the programmed and actual states, the logic circuit remains in a set condition. If the programmed and actual conditions disagree, the logic circuit 40 is reset. On scanning a memory word having a device address corresponding to an output coil, the output interface circuit 42 will decode the device address. Further, each time the logic processor decodes an output element an output strobe signal is generated on an output strobe line 44 and is transmitted to the output interface 42. If the logic circuit has detected a continuous correspondence between the actual and programmed conditions of the input devices 36, when the memory words containing an output element is decoded, the logic circuit 40 will produce an output signal in its set state on an output state line 46. The output interface 42 stores the state of the output signal on the output state line 46 in response to an output strobe signal on line 44. The output signal energizes one of the output devices 48 on the machine 10 corresponding to the device address decoded by the output interface 42. This device remains energized until on a subsequent scan of the memory 26 the logic circuit 40 determines that the conditions of the input devices associated with that output device do not correspond with the programmed conditions; and the logic circuit produces the output signal in its reset state on the output state line 46. Therefore, the output devices on the machine 10 may be controlled as a function of the desired conditions of the input devices on said machine.

It should be noted that the logic processor 18 is only capable of making simple logic decisions. If the output devices on the machine must be controlled in accordance with an arithmetic function, the data processor 20 may be optionally connected to the contact bus 22. The data processor may typically contain a program store 50, an arithmetic unit 52 and a data store 54. The program store 50 contains a number of programs each comprised of a series of macroinstructions to execute the desired arithmetic function. As discussed earlier, a block of device addresses is allocated and preassigned to the data processor to select the programs stored therein. The data processor is connected to the address bus 32, the output strobe signal line 44 and the output state signal line 46. When a memory word is scanned which contains a device address corresponding to one of the stored programs and the machine conditions are such that the arithmetic function defined by that program is required, the logic circuit will produce the output signal in its set state on the output state line 46. This signal will be stored by the data processor in response to an output strobe signal on line 36, and the addressed program will begin its execution. If the program requires other data for its execution, this data may be obtained from elements connected to a data bus 56. Although not specifically shown, the data bus 56 contains address lines, multiple bit data lines and timing control lines. After the arithmetic funtion has been executed, the data processor awaits a device address representing an input element and associated with the execution of the arithmetic function. Upon receiving this address, the data processor produces an input signal representing the result of the arithmetic function on the line 38 back to the logic circuit 40. It should be noted that the data processor 20 and logic processor 18 operate asynchronously with each other.

In summary, the logic processor 18 is a logic controlled fixed sequence processor which continuously monitors a correspondence between the desired machine conditions as represented by the memory words and the actual machine conditions as represented by the input signals from the machine. If correspondence occurs, output devices are energized as called for by the program. If a correspondence does not occur, the output devices will not be energized. The logic processor 18, as a stand-alone device, is operative to control the operation of many relatively simple machines. However, the logic processor only executes logic decisions and is incapable of performing arithmetic operations. A contact bus is connected between the logic processor and the machine and carries only single data bit contact information. If arithmetic operations are required, the logic processor generates an output signal which is decoded by the data processor and is operative to select a stored program of arithmetic instructions in the data processor. The data bus connects the data processor to data signal devices on the machine and transfers the multiple data bit information therebetween. While the data processor is executing the arithmetic instructions, the logic processor asynchronously continues through its sequential cycle of operation. At times determined by its stored program, the data processor produces input signals back to the contact bus. These signals are accepted by the logic processor at points in its cycle of operation when their corresponding device addresses are produced on the contact bus. A programmable machine function controller as generally described above is described in detail in copending U.S. patent application Ser. No. 677,712 entitled Asynchronous Dual Function Multiprocessor Machine Control which is assigned to the present assignee. Further, the same machine controller is commercially available from Cincinnati Milacron Inc.

As mentioned earlier, the machine includes a movable element 12 connected to a motor 14 which is responsive to a motor drive circuit 16. The motor drive circuit receives a velocity signal from a motor control 58 which in turn is responsive to a digital feed rate control 60. The digital feed rate control is responsive to another allocated block of addresses on the address bus 32 which define the basic functions associated with the determination of velocity of the movable element 12. For example, the velocity may be increased or decreased. Further, a fixed rapid velocity may be commanded. The digital feed rate control 60 is also responsive to the data bus for receiving a data signal representing the magnitude of the desired velocity. This data signal may be modified in accordance with input signals received from the contact bus and then returned to the data processor in its modified state. The digital feed rate control 60 is responsive to the data signal representing velocity for producing an analog velocity signal to the motor control 58 directly representing the desired velocity of the movable element. The motor control 58 is responsive to the contact bus to receive output signals therefrom representing the direction of motion of the movable element, when motion is to be initiated and terminated, in what measuring system motion is to be executed, etc. Further, the motor control 58 receives signals from the data bus representing the desired displacement of the movable element. The motor control responds to the velocity signal from the digital feed rate control and the command signals from the contact bus and produces the appropriate signals to the motor drive circuit 16 to generate a desired motion of the movable element. The displacement of the movable element is also controlled by the motor control; and after the desired displacement has occurred, the motor control 58 is operative to terminate the motion of the movable element 12.

Also associated with the machine is an I/O panel 62 which is remotely located from the basic machine controller. The I/O panel may be located anywhere in the vicinity of the machine in which it would be most useful to the operator. The I/O panel may contain any number of devices depending on the type of machine and the general purpose of the panel. For purposes of this disclosure, only I/O devices are illustrated which communicate data information to and from the controller. These devices include push buttons 66, lights 65, and readouts 68.

The push buttons 66 generate alphabetic, numeric or functional input data signals which pass through the push button interface 84 along the external data bus 86 to the external data interface 88. At this point, the input data signals are converted to a serial data signal and transferred to the internal data interface 90 via the line 92. The signals are then transferred to the data processor 20 along the data bus 56. Similarly, the data processor produces output data signals along the data bus 56 to the internal data interface 90 which transforms the signals into a serial data signal. The serial data signal is transferred along line 94 to the external data interface 88 which transfers these signals along the external data bus 86 to the readout interface 96 and readouts 68 and also to the light interface 71 and lights 65.

Figure 2A:
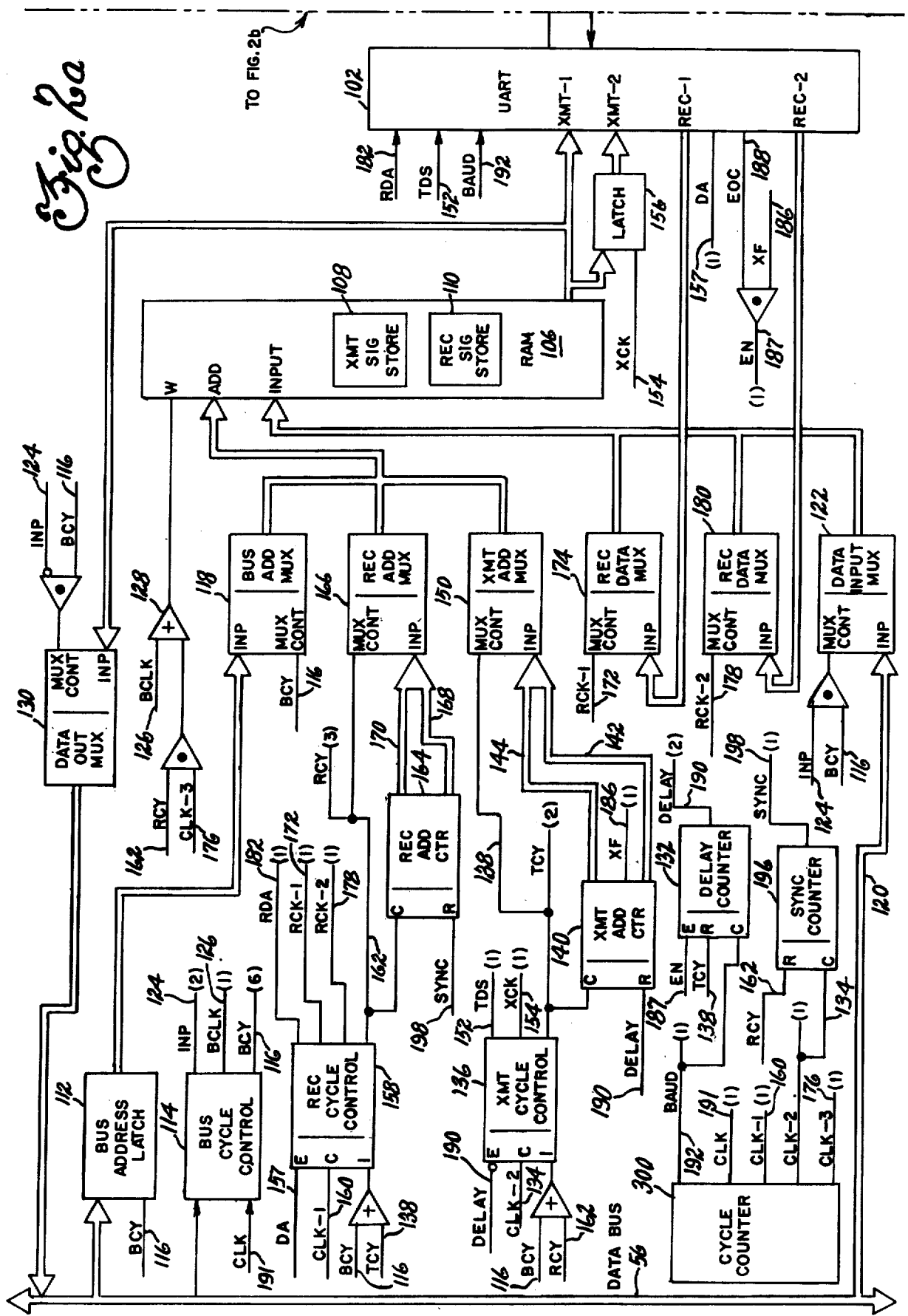
FIGS. 2a and 2b when joined along the indicated junction line illustrate the apparatus required to serially transmit the input and output data signals from the data bus to the I/O devices on the remote machine control panel.
Figure 2B:
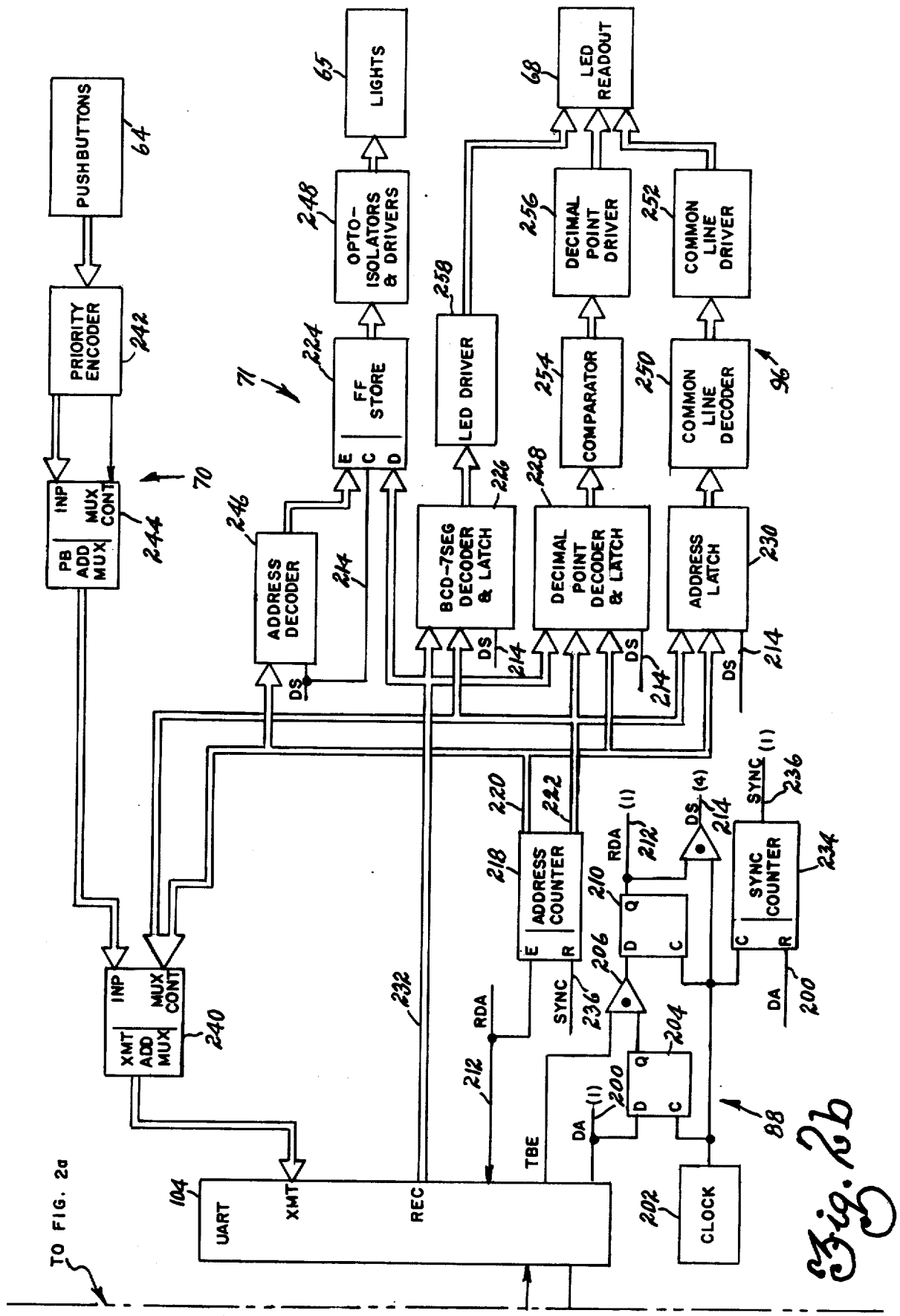

FIGS. 2a and 2b when joined along the indicated junction line illustrate the detailed elements required to transfer the input and output data signals from the data bus to the I/O devices on the panel 62. The internal data interface 90 is shown in FIG. 2a. FIG. 2b illustrates the external data interface 88, external data bus 86, the specific I/O devices and their associated interface circuits.

The data signals are transmitted between the data interfaces by universal asynchronous receiver/transmitters (UARTs) 102 and 104. These devices are commercially available units which operate asynchronously with each other and the other elements in the control system to cyclically and continuously transmit serial data signals therebetween. Referring to FIG. 2a, a RAM 106 is divided into a transmit signal store 108 and a receive signal store 110. The ram 106 is involved in all three cycles of operation of the internal data interface. First, data signals are transferred from the data processor via the data bus 56 into the RAM 106. Second, signals are transferred from the transmit signal store 108 within the RAM 106 to the UART 102 for transmission to the UART 104. Further, the UART 102 receives signals from the UART 104; and these signals are transferred to the receive signal store 110. Finally, signals from the receive signal store are transferred back to the data processor via the data bus 56.

Assume the data processor desires to transfer or receive a data signal. An address is transmitted along the data bus 56. This address is decoded by a bus address latch 112. Further, the data processor generates clock signals on the data bus 56 which are received by a bus cycle control 114. The bus cycle control generates a bus cycle signal on line 116. The bus cycle signal inhibits the operation of the other control modes of the internal data interface until information has been transferred between the data bus 56 and the RAM 106. The bus cycle signal is also transferred to a multiplex control of a bus address multiplexer 118 which has an input connected to the bus address latch. The bus address multiplexer is connected to the address input of the RAM 106 and selects a particular storage location within the RAM corresponding to the address signal generated by the data processor. If the data processor is to transfer data to the RAM, this data is received on bus line 120 which is connected to the data input multiplexer 122. The bus cycle control produces an input signal on line 124 which along with the bus cycle signal on line 116 produces a multiplex control signal for the data input multiplexer 122. Further, the bus cycle control produces a bus clock signal on line 126 to gate 128 which is connected to the write input of the RAM 106. Therefore, in response to the bus clock signal, the data is transferred into a storage location selected by the bus address multiplexer 118. If the address multiplexer 118 has selected a storage location in the receive signal store 110, the output of the RAM 106 is connected to an input of a data output multiplexer 130. The data output multiplexer has a multiplex control responsive to the signals generated by the bus cycle control for controlling the transfer of the data signal from the receive signal store 110 to the data bus 56 and thence to the data processor 20.

Another operational mode is the transmit cycle mode. Given the proper state of the output of the delay counter 132 and the occurrence of a clock 2 pulse on line 134 from the cycle counter 130, the transmit cycle control 136 will produce a transmit cycle signal on line 138. This signal clocks a transmit address counter 140. The transmit address counter produces two address signals on lines 142 and 144, the significance of which will be described later. For present purposes, it sufficient to note that the address signals on the address lines 142 and 144 describe a unique location in the transmit signal store 108. These address lines are connected to an input of a transmit address multiplexer 150 having a multiplex control connected to the transmit cycle signal. The transmit cycle control 136 also produces a transmit clock on line 154 to clock a latch 156 which stores the data signal currently being selected by the transmit address multiplexer 150. At this point, the transmit address counter increments to the next storage location and the transmit cycle control then produces a transmit data strobe on line 152 to cause to UART 102 to accept the output of the latch 156 and the current addressed output of the transmit signal store 108. This technique of loading the UART 102 is used because the data signals are binary coded decimal (BCD) words. Consequently, each byte representing a BCD digit of each data word is four bits long. The UART 102 has a capacity to accept eight bits per input strobe. Therefore, with each input strobe, two four-bit BCD digits are loaded.

If the internal data interface is neither in the bus cycle mode nor in the transmit cycle mode, the UART 102 may produce a data available signal on line 157. This signal enables a receive cycle control 158 which is also responsive to a clock-1 signal on line 160. The receive cycle control produces a receive cycle signal on line 162 which clocks a receive address counter 164 and is connected to a multiplex control of a receive address multiplexer 166. The receive address counter produces address signals on lines 168 and 170 to the inputs of the receive address multiplexer 166. These signals define a unique storage location within the receive signal store 110. Further, the receive cycle control produces a receive clock-1 signal on line 172 which is connected to a multiplex control input of a receive data multiplexer 174. This multiplexer receives a BCD digit or four binary bits from a receive output of the UART 102. Upon the generation of a clock 3 signal on line 176 from the cycle counter 130, the BCD digit stored in the receive address multiplexer 174 is written into the storage location of the receive signal store 110 being addressed by the receive address buffer 166. Next, the receive address counter increments to the next address thereby addressing a successive storage location within the receive signal store. At this point, the receive cycle control generates a receive clock-2 signal on line 178 which is connected to the multiplex control of a receive data multiplexer 180. The data multiplexer 180 is responsive to the other BCD digit or remaining four binary bits in the byte received by the UART 102. On the next clock-3 signal on line 176, the multiplexer 180 transfers this second BCD digit to the storage location in the receive signal store 110 currently being addressed by the receive address multiplexer 166. At the end of the receive cycle, the receive cycle control 158 produce a reset data available signal on line 182 to the UART 102.

Although the UARTs 102 and 104 operate asynchronously with each other, the receive and transmit address counters associated with one UART are synchronized with the operation of the other UART. For example, at the completion of a full transmit cycle, the transmit cycle signal disappears. Further, the transmit address counter produces a final signal on line 186. This signal in conjunction with an end of character signal from the UART 102 on line 188 enables the delay counter 132. The output of the delay counter on line 190 changes state to disable the transmit cycle control 136. The delay counter is clocked by baud clock pulses on line 192 from the cycle control 130. At the end of the first predetermined period of time, the delay signal changes state again thereby enabling the transmit cycle control 136. If the interface circuit is not in a bus cycle or a receive cycle at this time which would inhibit its operation via gate 194, the transmit cycle control will again initiate a transmit cycle signal on line 138. Therefore, the UART 102 is executing a continuous baud cyclic transmission of data signals to the UART 104. The UART 104 contains a similar transmit cycle control mechanism, and it in turn is transmitting data signals on a cyclic basis to the UART 102. Consequently, after a data available signal has occurred, this signal will be absent for the first predetermined period of time as a result of the delay signal inhibiting the transmission cycle of the UART 104. Consequently, the reset input of the sync counter 196 will not be energized by the receive cycle on line 162, and the sync counter 196 may be clocked for a second predetermined period of time after which a sync signal is produced on line 198. This sync signal resets the receive address counter 164. After this period of time, the receive cycle control 158 may respond to the next data available signal assuming it is not being inhibited by a bus cycle signal or transmit cycle signal via gate 200.

As mentioned earlier, the UARTs transmit the data signals therebetween on a serial basis. Referring to FIG. 2b the external data interface is shown generally at 88. After the UART 102 has initiated a transmit cycle, the UART 104 produces a data available signal on line 200. After baud clock signal from the clock 202, the flip flop 204 produces an output signal to AND gate 206. If the UART 104 is not in a transmit cycle, the UART 104 will produce a transmitter buffer empty signal on line 208. On a subsequent baud clock signal from clock 202, flip flop 210 produces a reset data available signal on line 212. This signal in combination with another baud clock signal produces a data strobe signal on line 214 from AND gate 216. At this point in time, the address counter 218 is generating an address signal on address lines 220 and 222 which uniquely define an element in either the flip flop store 224 or one of the latches 226, 228 or 230. Upon the occurrence of the data strobe signal on line 214, the addressed element stores or latches the data signal on the input bus 232 from the UART 104. The reset data available signal also increments the address counter thereby establishing a new address on the address lines 220 and 222 which will be effective during the next occurrence of a data available signal.

The data available signal resets the sync counter 234. In the absence of a data available signal, e.g. when the delay counter 132 (of FIG. 2a) is inhibiting the receiver transmitter 102 from transmitting for the first predetermined period of time, the delay signal on line 200 will not occur for that period of time. Therefore, the sync counter 234 will be allowed to continue its count for the second predetermined period of time and generate a sync signal on line 236 which resets the address counter 218.

It should further be noted that the address lines 220 and 222 are input to a transmit address multiplexer 240. Therefore, with each change in address of the address counter 218, output data signals from the push button interface 70 are multiplexed into the transmit input of the UART 104 for transmission to the UART 102. Since the data available signal on line 200 is inhibited from occurring for the delay time of counter 132, and since the data available signal on line 200 is required to increment the address counter 218, each transmission cycle of the UART 104 will in turn include a delay for the first predetermined period of time.

The input data signals are generated by push buttons 64. The outputs of these push buttons are connected to a priority encoder 242 which produces a first signal to a multiplex control input of a push button address multiplexer 244 as well as address inputs thereto. The push button address multiplexer multiplexes the addresses of the energized push buttons which are received from the priority encoder 242 into an input of the transmit address multiplexer 240. As described earlier, this device multiplexes these addresses to the UART 104.

The light interface shown at 71 is comprised of an address decoder 246, flip flop store 224 and opto-isolators and drivers 248. Upon the occurrence of a data strobe signal on line 214, the address decoder decodes the address currently being generated by the address counter 218. This address enables a particular storage location in the flip flop store 224. Upon the occurrence of another edge of the data strobe signal, the input data signal on the bus 232 representing the desired state of a light is stored in the addressed flip flop. Each of the flip flops in the store 224 are connected to one of the lights 65 by means of one of the opto-isolator and driver circuits 226.

The readout interface circuit is shown generally at 96. An address latch 230 latches the current address from the address counter 218 in response to a data strobe signal 214. This address is decoded in a common line decoder 250 which produces a signal to energize a particular common line driver in the common line driver circuits 252 thereby energizing one of the common lines in the LED readout 68. Similarly, the decimal point decoder and latch 228 latches the current address of the address counter 218 and the data output signal on the bus 232 in response to a data strobe signal 214. The output of the decoder and latch 228 is input to a comparator 254 wherein the new location of the decimal point is compared in a relative manner to the present location of the decimal point. This allows the decimal point to be moved one digit at a time across the readout. The output of the comparator is connected to a decimal point driver 256 having an output for driving the decimal point display in the LED readout 68. A BCD to seven segment decoder and latch 226 is responsive to the addresses from the address counter 218. The data output signals on bus 232 and the data strobe on line 214 to decode and latch signals representing the seven segments of the LED to be energized to display the numerical digit corresponding the data output signal. An LED driver 258 is responsive to the decoder and latch 256 for driving the individual numerical displays of the LED readout 68.

It should be noted at this point that the particular address of an individual push button light or readout is not generated directly by the data output signals from the data processor but are generated by the address counters in the data interfaces shown in FIGS. 2a and 2b. In the preferred embodiment, the push buttons, lights and readouts can be imagined to be located in an arbitrary row column matrix wherein each position in the matrix is four bits deep. Therefore, each position in the matrix contains enough information to define the numerical value of one digit of the LED readout 68. Further, each matrix position can define the state of four lights or four push buttons. In the preferred embodiment, the push buttons, lights and readouts are assigned permanent positions in this row-column matrix. Further, the outputs of the address counters 140, 164 (FIG. 2a) and 218 (FIG. 2b) contain address signals which uniquely define each matrix position on a row-column basis. Therefore, in FIGS. 2a, address lines 170 and 144 represent column address buses; and lines 168 and 142 represent row address buses. Similarly, in FIG. 2b, address line 220 represents a column address bus; and address line 222 represents a row address bus. Further, with each complete cycle of the address counter 218, each row-column matrix position is addressed and the states of the I/O devices associated with all the matrix positions are updated.

As is apparent from the earlier discussion, the UARTs 102 and 104 operate on a cyclic basis to continuously transmit information therebetween. The data character transferred in a particular cycle is a function of the design of the particular UART. However, the number of characters transferred is determined by the circuit designer. The data signals described herein are binary coded decimal; therefore in the preferred embodiment, a 64 position BCD matrix is defined. Each byte of information is defined by a column number and two successive row numbers, and with each successive byte, successive pairs of rows are addressed and then successive columns are addressed. In the case of numeric readouts, each matrix column represents a decimal order of magnitude and each matrix row defines a readout number. The effect of the addressing scheme is to scan all the least significant digits of the readout numbers and then move sequentially through the number to the most significant digits. Therefore, with each cycle, the UART multiplexes new information into the readouts.

The UARTs can be driven at such a clock rate that as they scan across the readout with new updated information, the new information will dynamically appear; but the old unchanged information appears stable to the human eye. Using the UARTs to multiplex the readouts has the further advantage that buffer storage is not required with the remotely located I/O panel. The buffer store has a disadvantage in that any incorrect information which is stored because of noise or other problems is displayed until the buffer store is updated. In contrast, if the UART is used to multiplex the readout, incorrect information is generally only displayed for one UART cycle and is therefore indiscernible.

Figure 3:
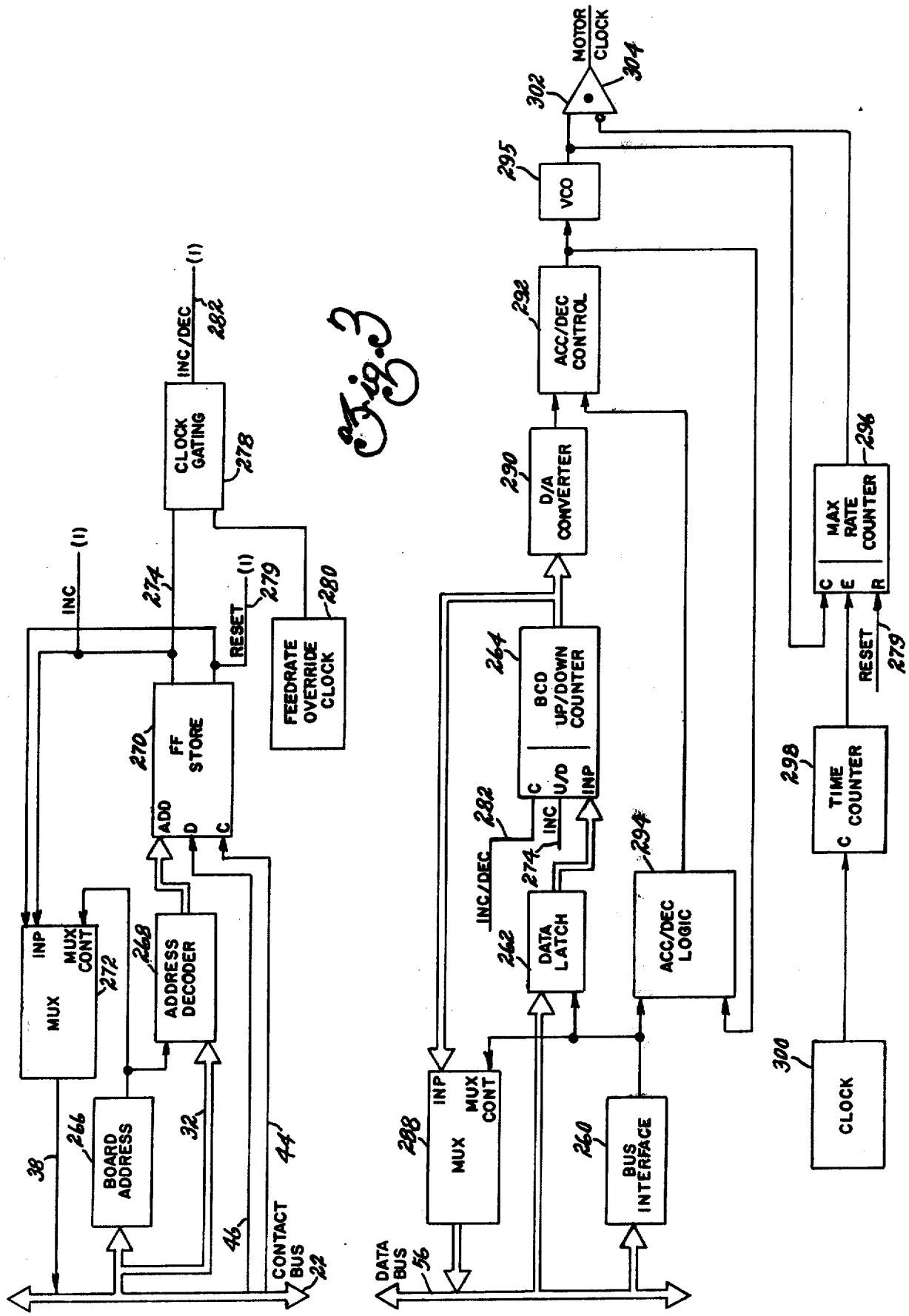
FIG. 3 is a detailed blocked diagram illustrating the apparatus required to generate a velocity signal representing the desired velocity of the movable element.
Figure 5:
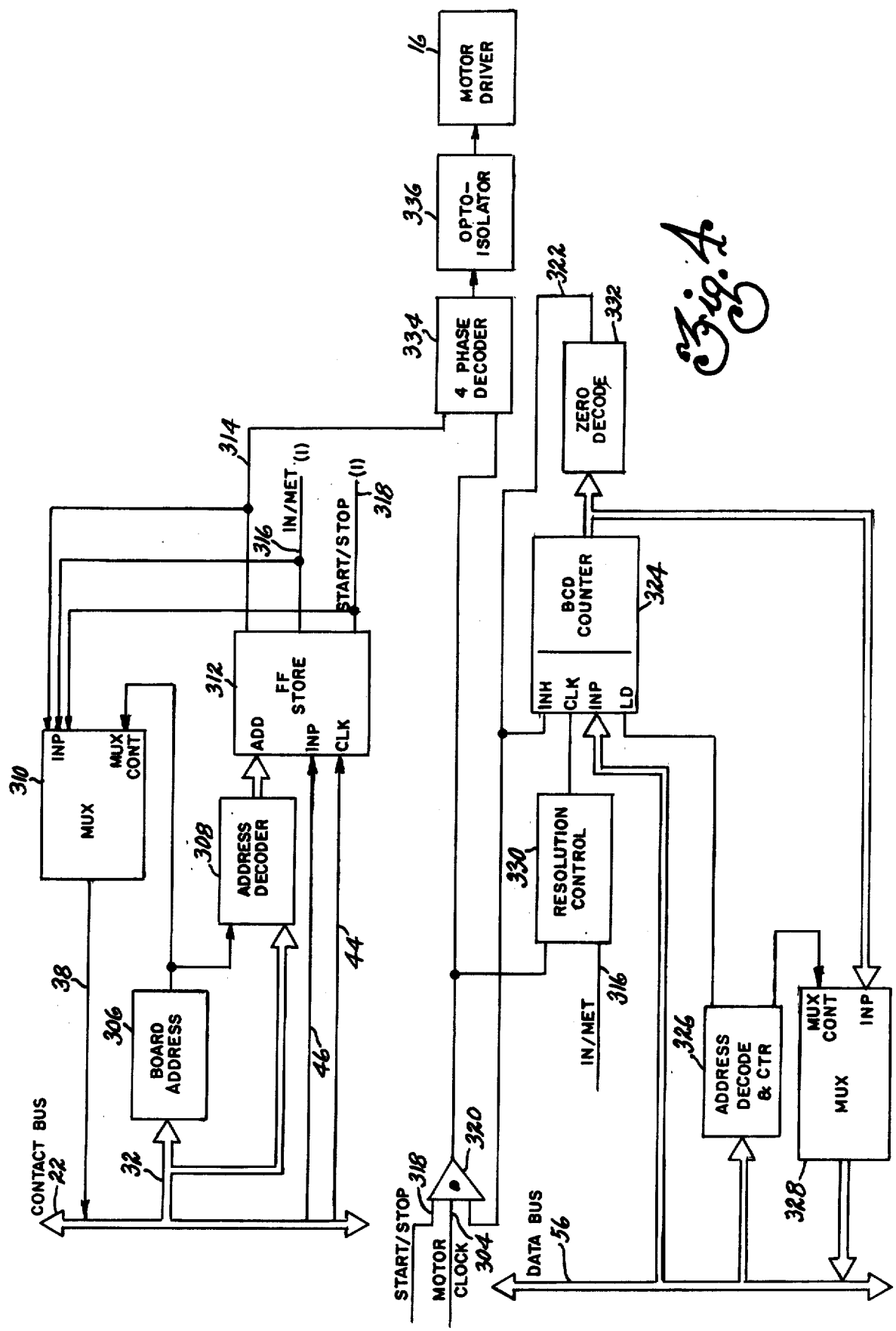

FIG. 3 is a detailed block diagram illustrating one embodiment for generating an analogue signal representing the desired velocity of the movable element. A bus interface circuit 260 is connected to the data bus 56 for controlling the transfer of data from the data bus to a data latch 262. This data is then loaded into a BCD up/down counter 264 and is a digital signal representing the magnitude of the desired velocity of the movable element on the machine. Under normal circumstances, the counter 264 holds the digital velocity signal unchanged; however, in certain situations, an operator may observe that in the machine cycle one or more of the velocities should be changed. Controls are available to increase or decrease the velocity. Upon using these controls, the logic processor generates address signals on the contact bus 22.

A board address decoder 266 responds to the address signals for generating enable signals to an address decoder 268 which decodes the addresses and transfers the result to a storage device typically a flip flop store 270. The address enables one of the flip flops in the store, and input to the flip flop is responsive to the state of the signal on the output state line 46. Upon the occurrence of and output strobe signal on line 44, the output state is clocked into the flip flop selected by the address. A multiplexing circuit 272 is responsive to an increase signal on line 274 and a reset signal on line 279 and has a multiplex control responsive to the board address decoder 266. The multiplexer 272 transfers back to the contact bus 22 via the contact status return 38 the state of the output of the selected flip flop of the store 270. A clock gating circuit 278 is connected to the flip flop store 270 and a feed rate override clock 280 to produce an increase/decrease clock signal on line 282.

The counter 264 responds to the clock signal on line 282 and the increase signal on line 274 to increase or decease the digital value of the desired velocity signal. As the machine operator energizes the increase or decrease controls the digital counter will count up or down respectively until the movable element achieves the velocity desired by the operator. A multiplexer 288 is connected to the output of the counter 264 and multiplexes the digital value of the counter back along the data bus for storage in the data processor. If the machine operator changes the programmed velocity, the new velocity will be returned to the data processor and stored in place of the originally programmed velocity. Therefore, once the operator has optimized the velocity values during one cycle of operation of the machine these optimized values will be operative during subsequent machine cycle operations.

A digital-to-analogue converter 290 responds to the digital velocity signal from the counter 264 and produces a DC signal to an acceleration/deceleration control 292. A voltage controlled oscillator 295 is responsive to the DC signal for producing a pulse train representing a motor clock signal on line 304. The acceleration/deceleration control 292 is connected to an acceleration/deceleration logic circuit 294. The purpose of these two circuits is to control the transition from one DC voltage level to another in response to changes in the programmed velocity.

As will be appreciated by those who are skilled in the art, the use of a voltage controlled oscillator to obtain a velocity signal is well-known as are the acceleration and deceleration circuits associated therewith. The exact details of a particular type of oscillators and acceleration and deceleration control are a function of the machine to be controlled and its desired nature of operation. Therefore, the voltage controlled oscillator and acceleration and deceleration control circuits will not be discussed in further detail.

A maximum rate counter 296 is connected to the output of the oscillator 295 and inhibits the oscillator output when the oscillator output frequency exceeds a predetermined rate. A time counter 298 is responsive to a clock 300 for producing a load signal to the rate counter 296. The load signal loads the rate counter 296 with a predetermined number representing the maximum desired rate on the oscillator 295. Under normal circumstances, the counter 296 is responsive to the load signal to reload the maximum number therein before the output of the oscillator 295 is able to count the maximum rate counter to zero. However, if for some reason the output of the oscillator 295 should suddenly increase beyond the desired maximum, the output of the oscillator will count the maximum rate counter to zero before a successive load signal is received. In this circumstance, the maximum rate counter will generate an inhibit signal to a gate 302 which inhibits the motor clock signal on line 304. The maximum rate counter is reset by a reset signal which is operator generated and transmitted to the flip flop store 270 via the contact bus 22.

FIG. 4 is a detailed block diagram illustrating the elements necessary to control the displacement of the movable element on the machine 10. Commands relating the general operation of the movable element are converted to single bit digital signals and transmitted along the contact bus 22 to a board decoder 306. The board decoder decodes the address on line 32 and generates enable signals to an address decoder 308 and a multiplex control signal to the multiplexer 310. A storage element 312 preferably a flip flop store is connected to the address decoder 308 for enabling one of the flip flops in the store. The input to that flip flop responds to the output state signal on line 46 and is clocked into the flip flop by the output strobe signal on the output strobe line 44. The multiplexer 310 transmits via the contact status return line 38 to the contact bus the state of the output of the clocked flip flop. The store 312 generates a forward/reverse signal on line 314, an inch/metric signal on line 316 and a start/stop signal on line 318.

An AND gate 320 is responsive to the start/stop signal on line 318, the motor clock signal on line 304 and an in-position signal on line 322. This gate controls the transmission of the motor clock signal to the motor drive circuit and the displacement control circuit to be described. An address decode and counter circuit 326 is connected to the data bus for producing a first signal to control the loading of a BCD counter 324 with a data signal representing the desired displacement of the movable element. The address decode and counter circuit 326 produces another input to a multiplex control of a multiplexer 328 for transmitting the contents of the BCD counter back to the data processor via the data bus 56.

A resolution control 330 is responsive to the inch/metric signal on line 316 and the motor clock signal from the gate 320 and modifies the motor clock signal as a function of the resolution selected. The clock input of the BCD counter 324 is connected to the output from the resolution control 330 and counts down the number contained therein as the function of the motor clock signal. A zero decoder 332 is connected to the output from the BCD counter 324 and produces an in-position signal in response to the number in the counter being reduced to zero. The in position signal on line 322 is connected to an inhibit circuit on the counter 324 and is further connected to the gate 320 to inhibit the transmission of the motor clock signal to the motor drive circuit.

The motor clock signal is a pulse train wherein the frequency represents the desired velocity and each pulse represents an increment of displacement. Therefore, by counting the pulses, the BCD counter 324 measures the commanded displacement of the movable element. Before it clocks the BCD counter 324, resolution control 330 modifies the frequency of the pulse train thereby changing the scale by which the BCD counter 324 measures the commanded displacement. Although only inch/metric resolutions are illustrated, the resolution control 330 may be used to modify the frequency of the motor clock signal to accommodate any typical resolution.

In the preferred embodiment, the motor 14 is a stepping motor. Consequently, the motor clock signal from the oscillator is a pulse train. Further, the type of stepping motor used requires a four phase divider 334 which is responsive to the motor clock signal and the forward/reverse signal on line 314. Opto-isolator circuits 336 are used to electrically isolate the four phase divider 334 from the motor driver 16. As will be appreciated by those who are skilled in the art, there are many possible variations relative to the type of motor used to drive the movable element as well as the position and velocity controls associated therewith. The disclosure of a stepping motor and its associated velocity and displacement circuits is only illustrative in nature and is not in any way intended to limit the types of motors nor their displacement and velocity controls.

Returning to FIG. 1, one final circuit should be briefly described. In certain applications, the logic processor 18 may be required to receive or transmit data signals. To accomplish this, an intercommunications circuit 64 communicates data signals between the data bus 56 and contact bus 22 by transforming single bit data signals into multiple bit data signals and vice versa. Specifically, this is accomplished by interconnecting the two bus interface circuits. Referring to FIG. 3, the data bus interface circuit is comprised of a bus interface 260, a data latch 262 and a multiplexer 288. The contact bus interface circuit is comprised of a board address decoder 266, an address decoder 268, a flip flop store 270 and a multiplexer 272. The intercommunications circuit 64 may be comprised of the above elements; however these elements are joined by connecting the output of the data latch 262 to the input of the multiplexer 272 and connecting the output of the flip flop store 270 to the input of the multiplexer 288.

While the invention has been illustrated in some detail, according to the preferred embodiments shown in the accompanying drawings, and while the preferred illustrated embodiments have been described in some detail, there is no intention to thus limit the invention to such detail. On the contrary, it is intended to cover all modifications, alterations and equivalents falling within the spirit and scope of the appended claims.

What is claimed is:

1. An apparatus for controlling a machine having first output devices responsive to output state signals for commanding machine operations and first input devices for producing input state signals in response to the machine operations, said machine including second I/O devices responsive to output data signals and producing input data signals, and said machine further having a movable element in mechanical communication with a driving mechanism, the apparatus comprising:
   a. a programmable machine function controller means including
      1. a contact bus for transferring the input and output state signals,
      2. a data bus for transferring the input and output data signals,
      3. logic processor means connected to the contact bus and responsive to the input state signals for executing stored sets of logic instructions to generate the output state signals, and
      4. data processor means connected between the contact bus and the data bus for generating the output data signals and a further input state signal by executing asynchronously with the logic processor means stored sets of arithmetic instructions in response to the input data signals and one of the output state signals;
   b. an interface means connected to the controller means for controlling the transfer of the input and output state signals between the first input and output devices and the contact bus; and
   c. means responsive to the controller means and connected to the driving mechanism for controlling the operation of the driving mechanism thereby controlling the operation of the movable element.

2. The apparatus of claim 1, wherein the means for controlling the operation of the driving mechanism further comprises:
   a. means for generating a velocity signal representing a desired velocity of the movable element; and
   b. means responsive to the velocity signal and the contact bus for controlling the transfer of the velocity signal to the driving mechanism.

3. The apparatus of claim 2, wherein the means for generating velocity signal further comprises:
   a. means responsive to the contact bus for producing command signals representing changes in the velocity signal to selectively increase and decrease the velocity of the movable element; and
   b. means responsive to the command signals for modifying the generation of the velocity signal as a function of the command signals.

4. The apparatus of claim 3, wherein the means for generating the velocity signal further comprises means for modifying the velocity signal as a function of time thereby providing an acceleration and deceleration control of the movable element.

5. The apparatus of claim 4, wherein the means for generating the velocity signal further comprises:
   a. first means responsive to the contact bus for storing a reset signal and command signals representing an increase and decrease in the velocity of the movable element;
   b. means responsive to the first storing means for generating a clock signal;
   c. an up/down counter responsive to the data bus and the first storing means for storing a first output data signal representing the desired velocity of the movable element, said counter being responsive to the clock signal for modifying the magnitude of the first output data signal as a function of the command signals;
   d. a digital to analogue converter connected to the up/down counter for producing a DC signal representing the magnitude of the first output data signal;
   e. means connected to the converter for regulating the time rate of change of the DC signal from one magnitude to another thereby providing an acceleration and deceleration control of the movable element; and
   f. a voltage controlled oscillator connected to the regulating means for producing a pulse train having a frequency representing the desired velocity of the movable element and wherein each pulse in the train represents an increment of displacement of the movable element.

6. The apparatus of claim 5, wherein the means for generating the velocity signal further comprises means connected between the data bus and the up/down counter for transferring the first output data signal back to the data bus.

7. The apparatus of claim 6, wherein the means for generating the velocity signal further comprises:
   a. means for producing a reference signal representing the maximum allowable frequency of the pulse train; and
   b. means responsive to the oscillator and the reference signal for inhibiting the pulse train in response to the frequency of the pulse train exceeding the maximum frequency, said inhibiting means being connected to the first storing means for removing the inhibit of the pulse train in response to the reset signal.

8. The apparatus of claim 7, wherein the controlling means further comprises:
   a. means responsive to the data bus for storing a displacement signal representing the desired displacement of the movable element; and
   b. means responsive to the displacement signal and the velocity signal for inhibiting the transfer of the velocity signal to the driving mechanism in response to the velocity signal being input to the driving mechanism in a quantitative amount corresponding to the displacement signal.

9. The apparatus of claim 8, wherein the controlling means further comprises:
   a. means responsive to the contact bus for producing
      1. a first output state signal representing the desired direction of motion of the movable element, 2. a second output state signal representing a desired magnitude of displacement of the movable element in response to each pulse in the pulse train, and 3. a third output state signal for initiating motion of the movable element;

b. a gating network responsive to the pulse train, the third output state signal and another signal for controlling the transfer of the pulse train as a function of the third output state signal and the other input signal;

c. a down counter circuit connected to the data bus and the gating network for storing the displacement signal, said counter having a clock input responsive to the gating network thereby causing said stored displacement signal to be decremented in response to the pulse train;

d. a zero decoder connected to the down counter for producing the other input signal in response to the down counter decrementing the displacement signal to zero; and e. motor control circuits responsive to the first output state signal and the gating network for producing drive signals to the driving mechanism in response to the pulse train being transferred by the gating network.

10. The apparatus of claim 9, wherein the controlling means further comprises means connected between the gating network and the down counter and responsive to the second output state signal for modifying the frequency of the pulse train applied to the clock input of the down counter thereby controlling the displacement of the movable element in response to each of the pulses in the pulse train.

11. An apparatus for controlling a machine having first output devices responsive to output state signals for commanding the machine operations and first input devices for producing input state signals in response to the machine operations, said machine including second I/O devices responsive to output data signals and producing input data signals, and said machine further having a movable element in mechanical communication with a driving mechanism, the apparatus comprising:

a. a programmable machine function controller means including 1. a contact bus for conducting the input and output state signals to and from the controller means;

2. a logic processor means connected to the contact bus and responsive to the input state signals for generating the output state signals in accordance with a stored set of logic instructions;

3. a data bus for carrying the input and output data signals; and 4. a data processor means connected between the contact and data buses for producing the output data signals and a further input state signal by asynchronously executing with the logic processor means sets of arithmetic instructions in response to one of the output state signals and the input data signals;

b. an interface means connected between the first input and output devices and the contact bus for controlling the transfer of the input and output state signals between the first input and output devices and the logic processor means;

c. means connected between the second I/O devices and the data bus for serially transferring the input and output data signals between the second I/O devices and the data processor means; and d. means connected between the controller means and the driving mechanism for controlling the operation of the driving mechanism thereby controlling the operation of the movable element.

12. The apparatus of claim 11 wherein the logic processor means further comprises:

a. means for storing sequences of logic instructions, each sequence of logic instructions defining the desired states of the input state signals necessary to generate the output state signals; and b. means responsive to the storing means and the input state signals for producing the output state signals in response to the actual states of the input state signals on the contact bus corresponding to the desired states of the input state signals as defined by the storing means.

13. The apparatus of claim 12, wherein the data processor means further comprises:

a. means responsive to one of the output state signals for selecting a stored program of arithmetic instructions;

b. a data storage means for storing data signals; and c. means responsive to the stored program, the data signals and the input data signals for executing asynchronously with the logic processor means the arithmetic instructions to produce the output data signals and to cause the further input state signal to be available on the contact bus for use by said logic processor means.

14. The apparatus of claim 13, wherein the transferring means further comprises:

a. an external bus located with the second I/O devices for conducting the output data signals to and the input data signals from the second I/O devices; and b. means connected between the external bus and the data bus and operating asynchronously with the controller means for cyclically transmitting the input data signals and the output data signals therebetween by transforming the input and output data signals into first and second serial data signals respectively.

15. The apparatus of claim 14 wherein the transmitting means further comprises:

a. a first receiver/transmitter operating asynchronously with the controller means and located with the I/O devices for cyclically tranmitting the first serial data signal and receiving the second serial data signal;

b. a second receiver/transmitter means operating asynchronously with the first receiver/transmitter means, said second receiver/transmitter means being connected between the first receiver/transmitter means and the data bus for cyclically transmitting the second serial data signal and receiving the first serial data signal;

c. a first multiplexing means connected between the first receiver/transmitter and the external bus for controlling the transfer of the output data signals and input data signals between the first receiver transmitter means and the external bus; and d. a second multiplexing circuit connected between second receiver/transmitter means and the data bus for controlling the transfer of input and output data signals therebetween.

16. The apparatus of claim 15, wherein the second I/O devices further comprise push buttons for generating the input data signals and lights and readouts for receiving the output data signals, said second I/O devices further include means for interfacing the input and output data signals between said I/O devices and the external bus, and the second multiplexing means further comprises:
   a. a transmit signal store for storing the output data signals;
   b. a receive signal store for storing the input data signals;
   c. means responsive to the second receiver/transmitter means for causing during each cycle of the second receiver/transmitter means all of the output data signals from the transmit signal store to be transferred to the second receiver/transmitter means;
   d. means responsive to the second receiver/transmitter means for causing during each cycle of the second receiver/transmitter means all of the input data signals to be transferred from the second receiver/transmitter means to the receive signal store; and
   e. means responsive to the data bus for controlling the transfer via the data bus of
      1. output data signals from the controller to the transmit signal store, and
      2. input data signals from the receive signal store to the controller means.

17. The apparatus of claim 7, wherein the first multiplexing circuit further comprises:
   a. means responsive to each cycle of the first receiver/transmitter means for causing all of the input data signals to be transferred from the I/O devices to the second first receiver/transmitter means; and
   b. means responsive to each cycle of the first receiver/transmitter means for causing all of the output data signals be transferred from the first receiver/transmitter means to the second I/O devices, whereby said first and second receiver/transmitter means multiplex the input and output data signals to and from the second I/O devices during each cycle of operation of the first and second receiver/transmitter means.

* * * * *